United States Patent [19]
Orth et al.

[11] Patent Number: 4,818,994
[45] Date of Patent: Apr. 4, 1989

[54] TRANSMITTER WITH INTERNAL SERIAL BUS

[75] Inventors: Kelly M. Orth, Apple Valley; Steven M. Quist, Minnetonka; Roger L. Frick, Chanhassen; Randy K. Paschke, Chaska, all of Minn.

[73] Assignee: Rosemount Inc., Eden Prairie, Minn.

[21] Appl. No.: 112,226

[22] Filed: Oct. 22, 1987

[51] Int. Cl.$^4$ .............................................. G08C 19/16
[52] U.S. Cl. ......................... 340/870.21; 340/870.16; 340/870.17; 73/711
[58] Field of Search ...................... 340/870.04, 870.16, 340/870.17, 870.07, 870.21, 870.39; 73/706, 711, 721

[56] References Cited

U.S. PATENT DOCUMENTS

| | | | |
|---|---|---|---|
| 3,350,945 | 11/1967 | Bristol | 73/711 |
| 4,111,058 | 9/1978 | Gross | 73/721 |
| 4,370,890 | 2/1983 | Frick | 73/706 |
| 4,442,719 | 4/1984 | Coe et al. | 73/721 |
| 4,549,180 | 10/1985 | Masuda | 340/870.04 |
| 4,668,465 | 5/1987 | Boomgaard et al. | 340/870.07 |

Primary Examiner—John W. Caldwell, Sr.
Assistant Examiner—Tyrone Queen
Attorney, Agent, or Firm—Kinney & Lange

[57] ABSTRACT

An industrial process control transmitter has a modular construction, with a detector module and an output module electrically connected together by a serial bus. The output module includes a microcomputer, a modem for digital communication over the two-wire loop, analog output circuitry for controlling loop current, a digital-to-analog converter, and a memory for storing calibration factors and D/A characterization factors.

The detector module includes several sensors with associated circuitry to convert the sensor signals to digital signals. The detector module also includes a memory which contains characterization factors unique to the sensors which can be used by the microcomputer to correct the digital values provided by the detector circuitry. The microcomputer of the output module is considered the master unit, and all of the circuits of the detector board which interface with the serial bus are considered slave units. Data is collected by the microcomputer when a selected detector circuit provides an interrupt over the serial bus. The microcomputer then provides a select signal requesting data. The detector module provides data from the sensor circuits in a selected order in response to the select signal.

15 Claims, 3 Drawing Sheets

TRANSMITTER WITH INTERNAL SERIAL BUS

BACKGROUND OF THE INVENTION

1. Field of the Invention.

The present invention relates to a transmitter providing an output representative of a process variable.

2. Description of the Prior Art.

Transmitters which sense a process variable or parameter and provide a signal representative of the sensed parameter find widespread use in industrial process control systems. The transmitter is typically connected by two, three or four wires to a power source and a load. A two-wire transmitter includes a pair of terminals which are connected in a current loop with the power source and load so that the transmitter is powered by the loop current, while varying the magnitude of the loop current as a function of the sensed parameter. Three-wire and four-wire transmitters have separate leads for supply (energization) current and an output such as a current representing the process variable.

Electromechanical and analog electrical transmitters for sensing parameters such as pressure and temperature have been used for many years. More recently, with the advent of low power integrated circuits and low cost computer technology, transmitters have been developed which include some digital circuitry and, in some cases, microcomputers.

SUMMARY OF THE INVENTION

The present invention relates to a transmitter having a modular structure which includes a detector module connected together by a serial bus with an output module. The output module includes a digital computer (which in preferred embodiments is a microcomputer), and output circuitry for providing an output signal from the transmitter, based upon a control signal from the microcomputer, which is representative of a sensed parameter.

The detector module includes a plurality of sensing means which produce digital sensor signals representative of the process variable parameter and at least one other parameter used for correcting the digital signal representative of the sensed process variable parameter. The detector module also includes a memory which stores correction values which characterize the output of a first sensing means coupled to the process variable as a function of the outputs of a second sensing means.

Communication between the output module and the detector module is provided over the serial bus, with the computer acting as a master unit, and the sensing means of the detector module and the memory of the detector module acting as slave units. Communication is initiated by the microcomputer in response to an interrupt from a designated sensing means of the detector module. When communication is initiated by the computer by means of a select signal, the plurality of sensing means provide their digital sensor signals (if any) in a selected order. The sensing means and the memory communicate data serially to the computer over the serial data bus, avoiding a large number of lines which would typically be needed for a parallel bus structure.

The transmitter of the present invention provides significant flexibility and growth potential by the use of the serial bus and a prescribed protocol for communication on the serial bus. Modules can be interchanged or replaced, and enhanced detector modules with larger numbers of sensors can be used in conjunction with the same output module because of the use of the serial bus for interconnection between the two modules.

DETAILED DESCRIPTION OF THE PREFERRED EMBODIMENTS

Figure 1:
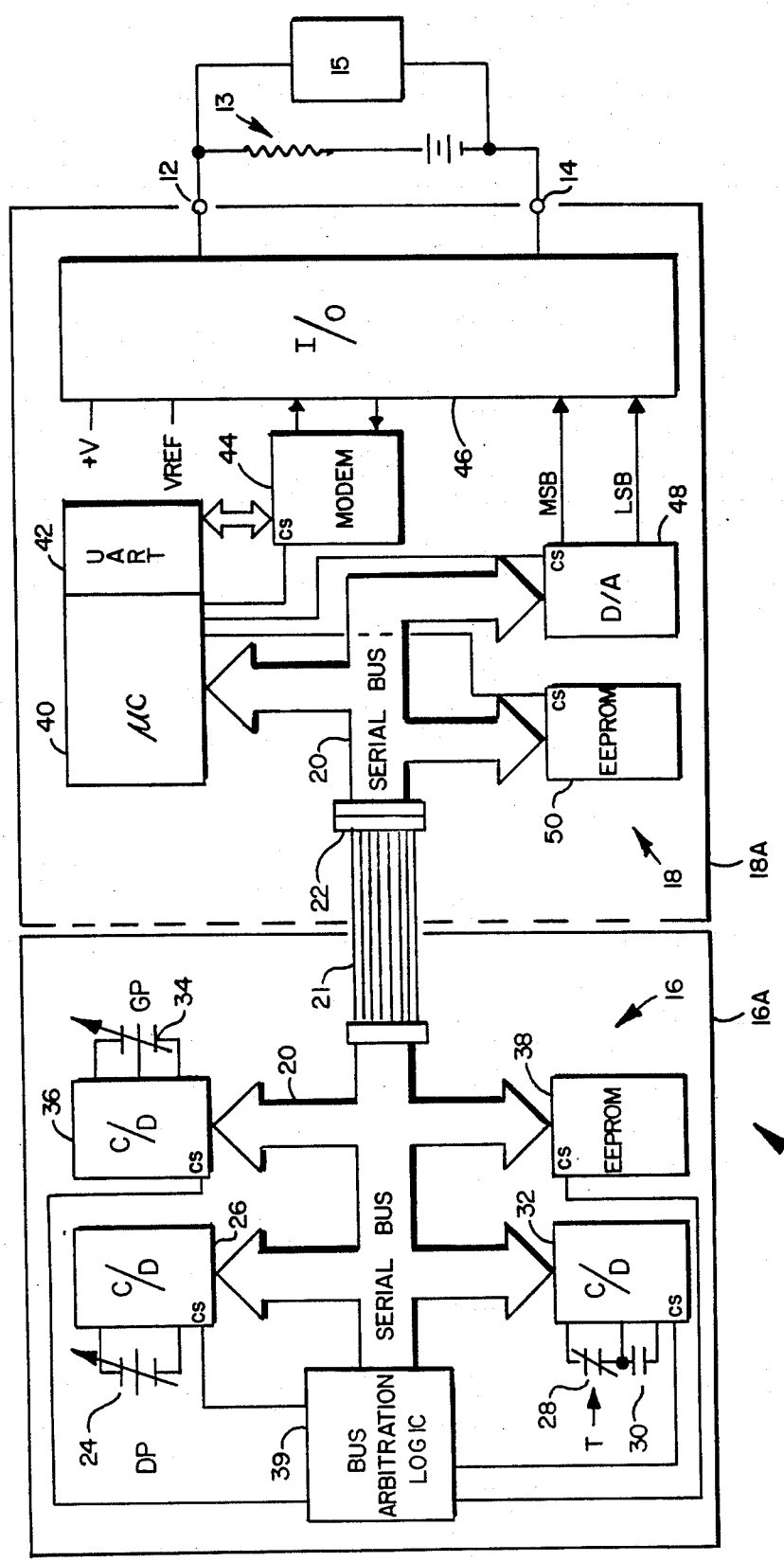
FIG. 1 is an electrical block diagram of a first embodiment of the modular transmitter of the present invention.

Transmitter 10 shown in FIG. 1 is a two-wire transmitter having a pair of terminals 12 and 14 which are connected to a two-wire current loop 13 in an industrial process control system. Transmitter 10 provides a signal over the two-wire loop connected to terminals 12 and 14 both in the form of a serial digital signal and by controlling the magnitude of the 4 to 20 milliampere loop current which flows into terminal 12 and out through terminal 14. All power for energizing transmitter 10 is received from the loop 13 through terminals 12 and 14.

Transmitter 10 has a modular structure having a detector module 16 in a first housing body 16A and an output module 18 in a second housing body 18A which are electrically coupled along serial peripheral interface bus 20 such as Motorola's (SPI) bus or National Semiconductor's Microwire bus. The bus 20 is extended between the two modules by a cable 21. Connector 22 connects together the two portions of serial bus 20 so that components of modules 16 and 18 can communicate with one another over the serial bus 20. Connector 22, which in one embodiment is a ten-pin connector, permits the modules 16 and 18 to be disconnected from one another for repair or replacement and so that modules 16 and 18 can be simply assembled in a final manufacturing step.

In the embodiment shown in FIG. 1, detector module 16 includes capacitive differential pressure sensor 24 and its associated capacitance-to-digital (C/D) converter 26; capacitive temperature sensor 28 and reference capacitor 30 and their associated C/D converter 32; capacitive gauge pressure sensor 34 and its associated C/D converter circuit 36; and EEPROM memory 38, all coupled to the serial bus 20.

In a preferred embodiment of the present invention, C/D converters 26, 32 and 36 comprise C/D converters of the type described in now abandoned U.S. patent application Ser. No. 06/855,178 filed Apr. 23, 1986 by Roger L. Frick entitled "MEASUREMENT CIRCUIT", which is assigned to the same assignee as the present invention. The description of the circuits contained in the above mentioned application are incorporated herein by reference.

In general terms, the C/D converter is preferably an integrating, continuous, non-zeroing type of converter which converts an analog signal produced by the sensors to a serial digital output value.

EEPROM 38 is a non-volatile memory which is used to store factory data such as characterization coefficients of the sensors and the C/D converters. The coefficients stored in EEPROM 38 are used to compensate for pressure sensor errors unique to the particular sensors 24, 28 and 34. For example, in a differential pressure (DP) transmitter, correction constants can include corrections of the DP sensor output for linearity, line or gauge pressure (GP) or temperature (T).

Output module 18 includes microcomputer 40 with associated universal asynchronous receiver-transmitter (UART) 42, modulator/demodulator (modem) 44, input/output (I/O) circuitry 46, digital-to-analog (D/A) converter 48, and electrically erasable programmable read-only memory (EEPROM) 50.

I/O circuit 46 is connected to terminals 12 and 14, and includes a shunt current control for varying the loop current as the function of an analog control signal. That analog loop current is controlled by pulse width modulated signals from D/A converter 48, based upon a signal from microcomputer 40. The operation of microcomputer 40, D/A converter 48, and I/O circuit 46 is described in more detail in the copending application Ser. No. 07/137,862 filed Dec. 24, 1987 by Roger L. Frick and entitled "ANALOG TRANSDUCER CIRCUIT WITH DIGITAL CONTROL" which is a continuation of now abandoned application Ser. No. 06/899,378 filed Aug. 22, 1986. The description contained in that copending application is incorporated herein by reference.

In addition to controlling the analog loop current to provide an analog signal representative of the sensed differential pressure, microcomputer 40 can also communicate by serial digital data in an FSK format. Modem 44 drives I/O circuitry 46 to modulate the loop current so as to superimpose the FSK signal on the DC loop current. The FSK signal is representative of the sensed parameter and can be received by serial communication device 15 external to transmitter 10. Modem 44 also receives and demodulates FSK serial data received at terminals 12 and 14 from serial communication device 15 and provides the demodulated digital data to microcomputer 40. The FSK modulation can be at a higher frequency and lower amplitude than the controlled loop current so that the two outputs are generated simultaneously on the loop without interfering substantially with one another. Alternatively, the controlled 4-20 mA loop current and the serial digital output can be generated alternately on the loop so as to avoid interference, and in this case, FSK modulation would not be required.

In yet a further alternative output arrangement called a "multi-drop mode," the transmitter 10 has its output current set to a substantially fixed DC level, such as 4 milliamperes, sufficient to energize the transmitter. In the multi-drop mode, the transmitter 10 is connected electrically in parallel with other transmitters (also in the multi-drop mode) on the same loop or pair of wires. Each of the transmitters on the multi-drop loop has a unique digital address and provides a serial digital FSK output when the transmitter's address is transmitted to the loop in an FSK format by the serial communication device 15. The FSK signals on the loop in the multi-drop mode are of sufficiently low amplitude and high frequency that the energization of the transmitters is not disturbed by the FSK signals. In the multi-drop mode, each of the transmitters on the loop operates as a slave unit and the serial communication device 15 operates as a master unit with respect to the communications.

EEPROM 50 stores coefficients used to compensate for D/A errors and other calibration and characterization coefficients unique to module 18. EEPROM 50 can also store span and zero settings received through the modem and I/O circuit from remote serial communication device 15. In contrast, EEPROM 38 which is contained in detector module 16 contains those coefficients and other data which are unique to the detector module 16. An example of data stored in EEPROM 38 is data indicating the materials of construction of the isolator diaphragms or flanges associated with the pressure sensors.

The division between detector module 16 and output module 18 reduces interconnections (by use of serial bus 20) and facilitates interchangeability in future upgrades while maintaining factory characterization and calibration. In a preferred embodiment of the present invention, serial bus 20 comprises an SPI bus and includes ten lines which are listed in Table 1.

TABLE 1

| |
|---|
| Circuit Common |
| Vref, a reference potential for C/D converters |
| V+, an energization potential, e.g. +5 volts |
| MISO, a first serial data line |
| MOSI, a second serial data line |
| SCK, a serial clock for clocking serial data transfers |
| CLOCK, a system clock for clocking C/D converters, microcomputer, D/A, modem, and UART |
| INT, an interrupt line |
| CS1, a chip select line |
| CS2, a chip select line |

As seen in Table 1, there is a single interrupt line and two encoded chip select lines among the ten lines of SPI bus 10. More encoded chip select lines could also be used to accommodate more input parameters. With the architecture of transmitter 10 of the present invention, the use of three sensors 24, 28 and 34, and even the addition of another sensor (such as a second differential pressure sensor with a different pressure range) does not require the addition of further lines. This is particularly advantageous, because it allows different or upgraded detector modules to be used with the same output module 18.

In the embodiment shown in FIG. 1, bus arbitration logic 39 of detector module 16 decodes the chip select lines CS1, CS2 coming from microprocessor 40 over serial bus 20 into individual chip select lines "CS" couple to the C/D converters 26, 32, and 34 and EEPROM 38. The logic states of two lines (CS1 and CS2) are used by bus arbitration logic 39 to grant different devices of sensor module 16 access to serial bus 20.

The transmitter of FIG. 1 can use a priority method for signalling microprocessor 40 that new data is available, so that only one line of SPI bus 20 needs to be used to signal that new data is available for all input data being provided from sensor module 16 to output module 18. One of the C/D converters (preferably the converter associated with the primary parameter being sensed, which in this case is C/D converter 26) is selected as the only circuit that can initiate a transfer of data to microcomputer 40. That initiation is provided through the interrupt line. If data from other sensors is also available, bus arbitration logic 39 passes the chips select from microcomputer 40 in a selected order from one C/D converter to another.

For example, if only differential pressure and temperature are being sensed (i.e. gauge pressure sensor 34 is not present or not being used) and temperature data is available, bus arbitration logic 39 will first pass the chip select from microcomputer 40 to C/D converter 26 associated with differential pressure sensor 24, and then to C/D converter 32 to transfer the temperature data before removing the interrupt signal and returning to other functions.

When gauge pressure is also being sensed, the priority is differential pressure, then gauge pressure, and then temperature. In that case, bus arbitration logic 39 passes the chip select from C/D converter 26 to C/D converter 36, and then to C/D converter 32.

If a second differential pressure sensor is added so that two different pressure ranges can be sensed, either differential pressure sensor can, through its C/D converter circuit, send an interrupt to microcomputer 40. The priority established by bus arbitration logic 36 is, then, the particular differential pressure, followed by the gauge pressure, followed by the temperature.

Figure 2:
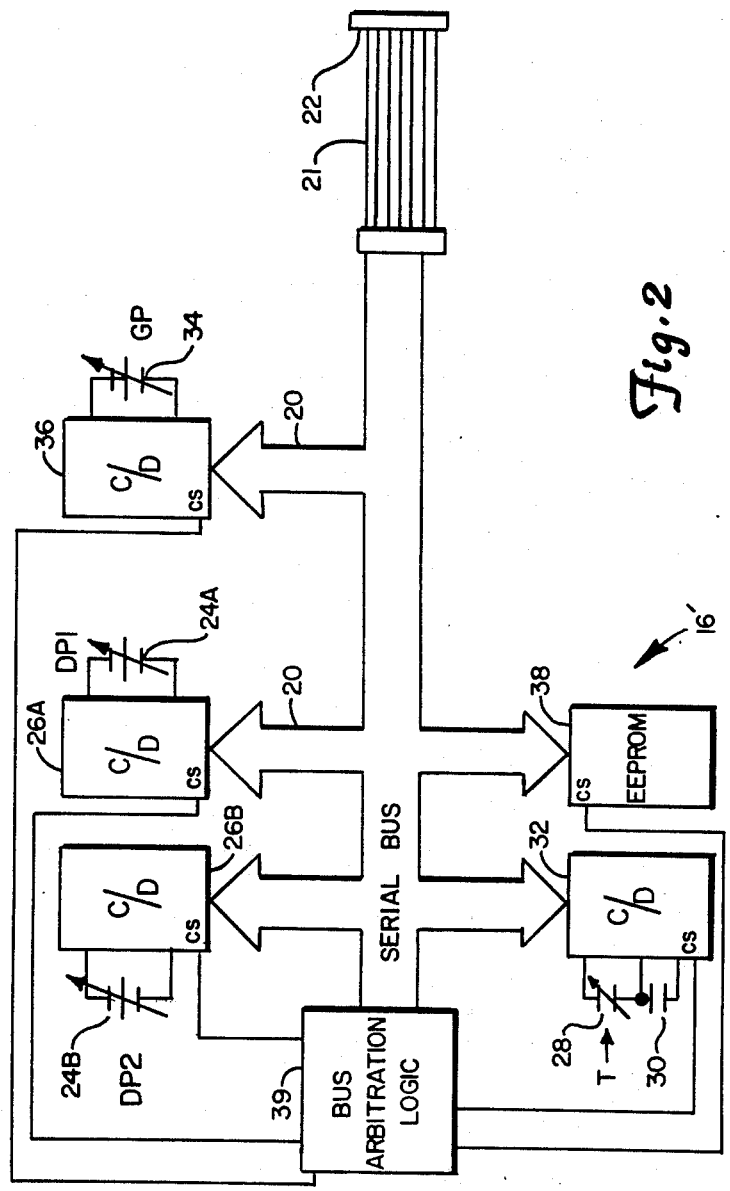
FIG. 2 is a block diagram showing a second embodiment of a detector module according to the present invention.

FIG. 2 shows detector module 16', which is similar to module 16 of FIG. 1, except that it includes two differential pressure sensors 24A and 24B and corresponding C/D converter circuits 26A and 26B, respectively. With the present invention, due to the modularity and the use of SPI bus 20, module 16' of FIG. 2 can be substituted for module 16 of FIG. 1 without requiring any changes in the interconnections between microcomputer 40 and the various C/D converters. Pressure sensors 24A and 24B both sense the same differential pressure (typically through the same pair of isolators), however, pressure sensors 24A and 24B have different full scale pressure ranges. This arrangement permits the transmitter to operate over a wider range of pressures without changing input modules. The pressure sensor 24A and 24B are preferably solid state pressure sensors with integral overpressure stops in each pressure sensor so that an individual pressure sensor is not damaged by pressures beyond its full scale. While only two differential pressure sensors 24A, 24B are shown in FIG. 2, the arrangement can be extended to include three or more differential pressure sensors as shown in FIG. 3.

Figure 3:
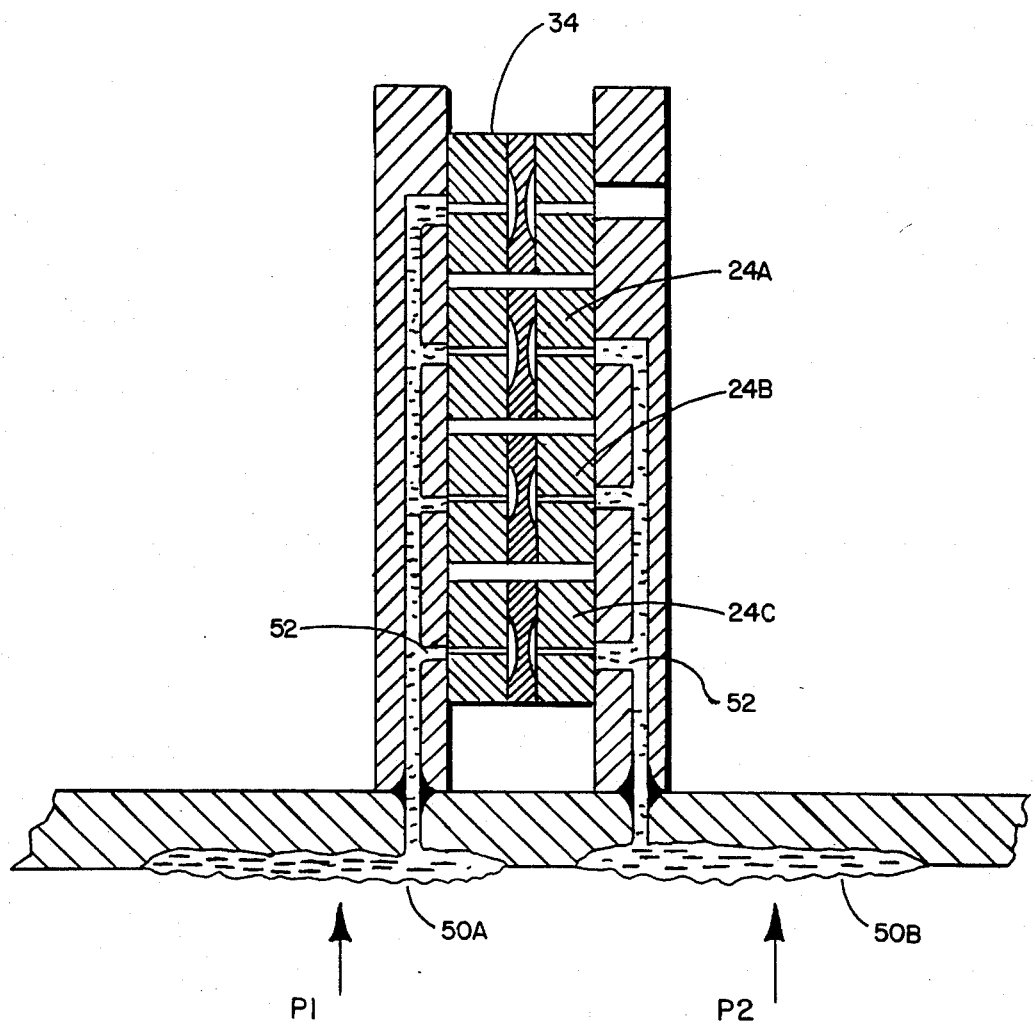
FIG. 3 is a sectional view of multiple sensors coupled to common isolator diaphragms according to the present invention.

As an example, three differential pressure sensors 24A, 24B, 24C with full scale ranges of 1 PSI, 10 PSI, and 100 PSI respectively can all be coupled to a common pair of isolator diaphragms 50A, 50B shown in FIG. 3. The microcomputer system 40 can then select a serial digital output from the differential pressure sensor which is producing the most accurate corrected output and calculate the transmitter output based on that most accurate output. The transmitter could thus make high accuracy pressure measurements with little zero error over a 1000:1 range of input differential pressures P1-P2, 0.1 to 100 PSI for example, without changing input modules. If needed, the microcomputer system 40 can be programmed with a software algorithm to smooth out discontinuities in the transmitter output signal during transitions from one sensor to another as the differential pressure changes. By using solid state sensors with low displacement and integral overpressure stops, a single transmitter configuration is capable of handling most process level and flow applications without excessive quantities of fill fluid 52 coupling pressure from the isolators to the sensors. The gauge pressure sensor 34 is likewise coupled to isolator 50A to obtain a gauge pressure measurement for correcting differential pressure measurements.

Another important advantage of the present invention is that the modular structure is particularly well suited to further consolidation and integration through the use of custom or application specific integrated circuits (ASIC). For example, all of the circuitry of detector module 16 (or module 16') other than the capacitive sensors can be consolidated into a single ASIC chip. Similarly, microcomputer 40, UART 42, modem 44, D/A converter 48, and EEPROM 50 are, in another embodiment of the present invention, incorporated into a single ASIC chip. Also included in the same chip is preferably a temperature detection circuit and temperature sensor for sensing the temperature of output module 18. I/O circuit 46 is also preferably included in a single ASIC chip. In this embodiment, therefore, the structure of the transmitter has been reduced to three integrated circuits, together with the capacitive sensors, with connections between the detector module and the output module provided by SPI bus 20.

In conclusion, the present invention, with its use of a serial bus for communication, and the modular architecture, offers a simple interconnect arrangement between modules and the ability to upgrade and modify the transmitter, without requiring total redesign of the transmitter. Upgrades involving additions of sensors, for example, do not require additional interconnections with the microcomputer provided, since all communications are provided over the SPI bus, and the bus protocol dictates that sensor readings will be provided to the microcomputer in a specified order upon the microcomputer having provided a chip select over the bus.

Although the present invention has been described with reference to preferred embodiments, workers skilled in the art will recognize that changes may be made in form and detail without departing from the spirit and scope of the invention. The digital output of the transmitter can, for example, also include digital signals indicating line pressure and sensed temperature within the scope of this invention.

What is claimed is:

1. A transmitter comprising:
   a serial bus;
   a detector module connected to the serial bus and including:
     a plurality of sensing means for coupling serial sensor signals representative of sensed parameters to the serial bus, one of the sensing means being capable of providing an interrupt signal over the serial bus to indicate when a sensing means has a digital signal to be sent; and
     means for selectively enabling the plurality of sensing means, in a selected order, to send their digital signals over the serial bus; and
   an output module connected to the serial bus and including:
     digital computer means for processing the digital sensor signals to produce a control signal; and
     means for producing a transmitter output signal as a function of the control signal.

2. The transmitter of claim 1 wherein the digital computer means is responsive to the interrupt signal and provides a select signal over the serial bus in response thereto; and wherein the means for selectively enabling initiates enabling in the selected order in response to the select signal.

3. The transmitter of claim 1 wherein the serial bus includes power supply lines, and wherein the output module includes means for supplying electrical power to the power supply lines.

4. The transmitter of claim 3 wherein the output module includes terminals for connecting the transmitter to a source of energization, and wherein the means for supplying electrical power is connected to the terminals.

5. The transmitter of claim 1 wherein the serial bus includes a clock line and wherein the output module includes means for providing a clock signal over the clock line.

6. The transmitter of claim 1 wherein the detector module further comprises memory means coupled to the serial bus for storing a correction to one of the serial sensor signals as a function of another serial sensor signal.

7. The transmitter of claim 6 wherein the output module further comprises second memory means coupled to the digital computer means for storing a correction for the transmitter output signal correcting the operation of the means for producing an output signal.

8. The transmitter of claim 1 wherein the plurality of sensing means are pressure sensors having different pressure ranges coupled to a common isolator diaphragm.

9. The transmitter of claim 8 wherein the pressure sensors have integral overpressure stops.

10. A transmitter providing a transmitter output representative of a process fluid pressure, comprising:
   isolator means having an isolator diaphragm coupled between a process fluid and an isolator fluid for isolatingly coupling the pressure therebetween;
   a plurality of pressure sensors receiving the pressure from the isolator fluid and providing a plurality of sensor outputs indicative of pressure over pressure ranges of different magnitudes for each sensor;
   selection means coupled to the sensor outputs for selecting the sensor output of a sensor having a pressure range including the present process fluid pressure;
   correction means in the transmitter for providing a corrected sensor output as a function of correction data stored in the correction means and the selected sensor output; and
   output means coupled to the correction means for providing the transmitter output as a function of the corrected sensor output.

11. The transmitter of claim 10 wherein each of the pressure sensors comprises an overpressure stop means for protecting the sensor from damage due to overpressure.

12. The transmitter of claim 10 wherein the transmitter senses a differential pressure and the isolator means further comprises a second isolator coupling the pressure to the plurality of sensors.

13. The transmitter of claim 12 further comprising a line pressure sensor coupled to the second isolator for sensing a line pressure, the correcting means correcting the sensor output as a function of the line pressure.

14. The transmitter of claim 13 further comprising a temperature sensor sensing a temperature in the transmitter, the correcting means correcting the sensor output as a function of the temperature.

15. The transmitter of claim 14 wherein the transmitter is coupled to a two-wire loop and the transmitter output comprises a serial digital signal representing the sensed pressure.

* * * * *

UNITED STATES PATENT AND TRADEMARK OFFICE
CERTIFICATE OF CORRECTION

PATENT NO. : 4,818,994

DATED : April 4, 1989

INVENTOR(S) : Kelly M. Orth et al.

It is certified that error appears in the above-identified patent and that said Letters Patent is hereby corrected as shown below:

Column 6, line 27, after "microcomputer", insert --be--.

Signed and Sealed this

Thirteenth Day of February, 1990

Attest:

JEFFREY M. SAMUELS

*Attesting Officer*   *Acting Commissioner of Patents and Trademarks*